United States Patent
Kawakami et al.

(10) Patent No.: US 6,886,531 B1
(45) Date of Patent: May 3, 2005

(54) CONTROL APPARATUS FOR AN INTERNAL COMBUSTION ENGINE

(75) Inventors: Teruaki Kawakami, Tokyo (JP); Tadahiro Azuma, Tokyo (JP); Toshiki Kuroda, Hyogo (JP); Hiroyuki Kobayashi, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/943,932

(22) Filed: Sep. 20, 2004

(30) Foreign Application Priority Data

Jun. 2, 2004 (JP) ........................................ 2004-164873

(51) Int. Cl.[7] ................................................. F02D 7/00
(52) U.S. Cl. ...................................... 123/399; 123/438
(58) Field of Search ................................ 123/337, 319, 123/344, 349, 367, 395, 399, 437, 438

(56) References Cited

U.S. PATENT DOCUMENTS 6,318,349 B1 * 11/2001 Muto et al. .................. 123/674
6,792,914 B2 * 9/2004 Fuwa .......................... 123/399

FOREIGN PATENT DOCUMENTS

JP          61-277843 A     12/1986

* cited by examiner

Primary Examiner—Bibhu Mohanty
(74) Attorney, Agent, or Firm—Sughrue Mion, PLLC

(57) ABSTRACT

A control apparatus for an internal combustion engine can limit a vehicle speed within a permitted maximum speed with high accuracy by preventing a response delay of a throttle opening with respect to an amount of intake air while avoiding deterioration of driveability. The apparatus includes a target opening calculating section that calculates a target opening of an electronic throttle valve from an accelerator opening, and an electronic control section that drives the electronic throttle valve to make the throttle opening coincide with the target opening. The target opening calculating section includes a correction factor calculating section that calculates a correction factor for correcting the target opening. The correction factor calculating section sets arithmetic calculation gains of mutually different correction factors for ranges of different characteristics in accordance with characteristics between the throttle opening and the intake air amount, whereby the target opening is controlled to prevent the vehicle speed from exceeding the permitted maximum speed.

4 Claims, 4 Drawing Sheets

CONTROL APPARATUS FOR AN INTERNAL COMBUSTION ENGINE

BACKGROUND OF THE INVENTION

1. Field of the Invention

The present invention relates to a control apparatus for an internal combustion engine capable of limiting the target opening degree of an electronic throttle valve so as to prevent the running speed (vehicle speed) from exceeding a permitted maximum speed.

2. Description of the Related Art

In a known control apparatus for an internal combustion engine, when the speed of a vehicle with a control apparatus mounted thereon reaches a permitted maximum speed, the throttle opening or the opening of a throttle valve is controlled in such a manner that if the actual vehicle speed is increasing during the time when the throttle opening is being driven to open or increase, the throttle opening is controlled to close or decrease, whereas if the actual vehicle speed is not increasing, the throttle opening is maintained as it is, whereby the vehicle speed is prevented from exceeding the permitted maximum speed (for example, see a first patent document: Japanese patent application laid-open No. 61-277843).

However, as is well known from the characteristic between the throttle opening and the amount of intake air, there exist a first range in which the amount of air increases linearly in accordance with the increasing throttle opening and a second range in which the amount of intake air remains substantially unchanged with respect to a change in the throttle opening.

Accordingly, in case where the actual vehicle speed is increasing with the throttle opening being in the second range at the time when the vehicle speed reaches the permitted maximum speed while the throttle opening is being driven to open or increase, the actual amount of intake air sucked into the engine will not decrease even if the throttle opening is driven to close or decrease as long as the throttle opening is in the second range.

As described above, in the known control apparatus for an internal combustion engine, the actual amount of intake air is not sometimes decreased even if the throttle opening is driven to close or decrease. Therefore, a problem arises that there is a possibility of the vehicle speed exceeding the permitted maximum speed to a substantial extent.

In addition, in order to prevent the vehicle speed from exceeding the permitted maximum speed, it is often necessary to acquire a signal indicative of the value of the actual vehicle speed, and hence another problem arises that if such a vehicle speed signal is missed due to an operation defect, a technical defect or the like, an overspeed preventive function will become unable to operate properly, as a result of which the permitted maximum speed might be exceeded.

SUMMARY OF THE INVENTION

The present invention is intended to solve the problems as referred to above, and has for its object to obtain a control apparatus for an internal combustion engine which is capable of preventing a response delay of the throttle opening relative to the amount of intake air thereby to limit the vehicle speed within a permitted maximum speed with a high degree of precision while avoiding deterioration of driveability, by calculating, in consideration of the characteristic of the intake air amount to the throttle opening, a correction factor by the use of a first large gain so as to quickly operate an electronic throttle valve in a first range in which the amount of intake air is not substantially changed in accordance with a change in the throttle opening, and by the use of a second gain that is smaller than the first gain in a second range in which the amount of intake air changes linearly with respect to a change in the throttle opening.

More specifically, a control apparatus for an internal combustion engine according to the present invention includes: an electronic throttle valve provided in an intake system of the internal combustion engine; an intake air amount detecting section that detects an amount of intake air sucked into the internal combustion engine; and an accelerator opening detecting section that detects, as an accelerator opening, an amount of operation of an accelerator pedal of a vehicle on which the internal combustion engine is installed. The control apparatus further includes: a speed sensor that detects a running speed of the vehicle; a target opening calculating section that calculates a target opening of the electronic throttle valve from the accelerator opening; a throttle opening detection section that detects a throttle opening of the electronic throttle valve; and an electronic control section that drives the electronic throttle valve so as to make the throttle opening coincide with the target opening. The target opening calculating section includes a correction factor calculating section that calculates a correction factor for correcting the target opening. The correction factor calculating section sets an arithmetic calculation gain of the correction factor corresponding to characteristics between the throttle opening and the amount of intake air in such a manner that arithmetic calculation gains, being mutually different from each other, are set for ranges of the characteristics different from each other.

According to the present invention, it is possible to prevent a response delay of the throttle opening to the amount of intake air thereby to limit the vehicle speed within the permitted maximum speed with high accuracy.

The above and other objects, features and advantages of the present invention will become more readily apparent to those skilled in the art from the following detailed description of a preferred embodiment of the present invention taken in conjunction with the accompanying drawings.

DESCRIPTION OF THE PREFERRED EMBODIMENTS

Now, a preferred embodiment of the present invention will be described below in detail while referring to the accompanying drawings.

Embodiment 1.

Figure 1:
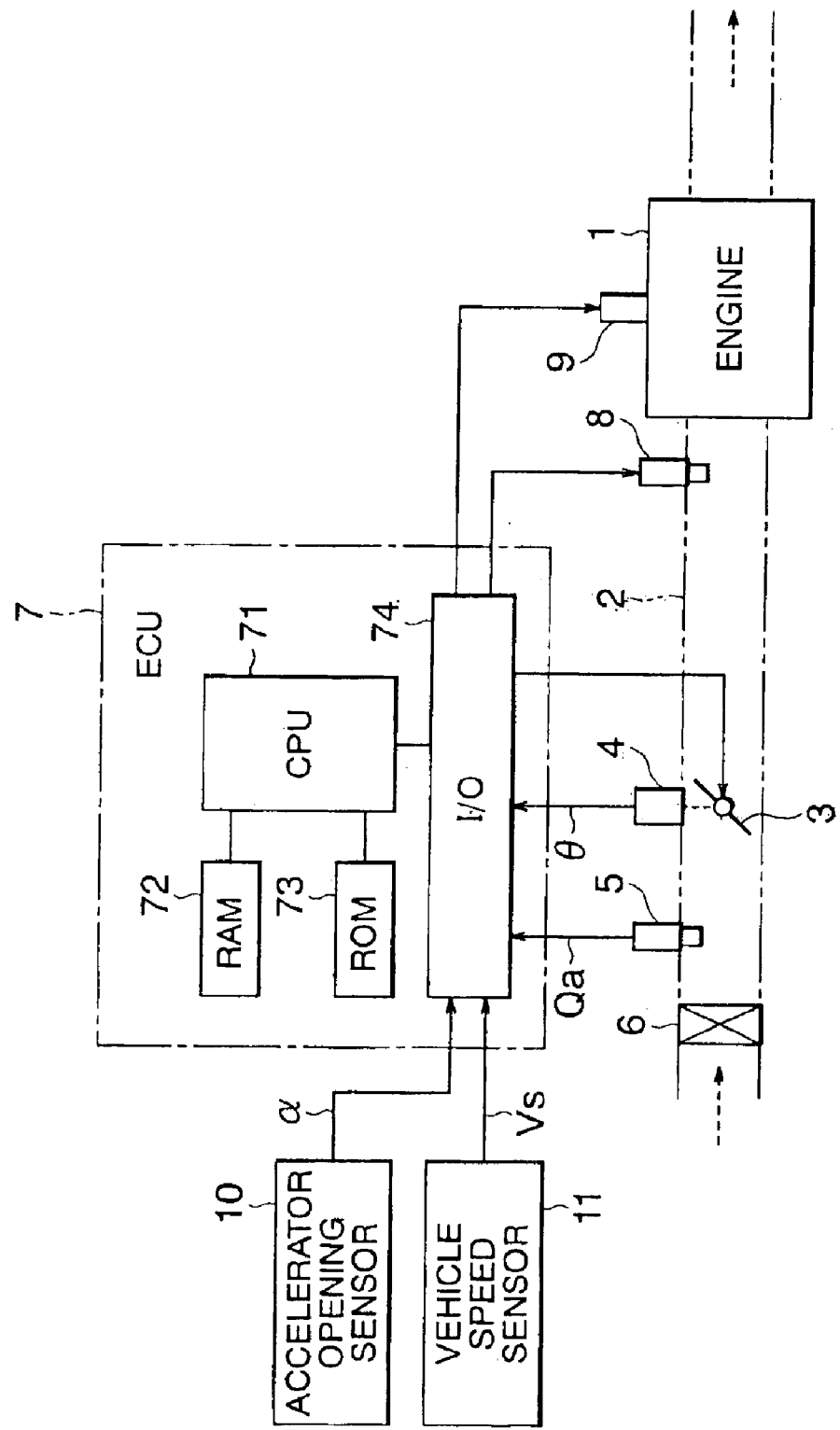
FIG. 1 is a block diagram schematically showing a control apparatus for an internal combustion engine together with its peripheral equipment according to one embodiment of the present invention.

FIG. 1 is a block diagram that illustrates a control apparatus for an internal combustion engine and its peripheral equipment according to one embodiment of the present invention.

In FIG. 1, an engine 1 installed on a vehicle (not shown) is provided with an intake pipe 2 that constitutes an intake system.

An electronic throttle valve 3 is arranged in the intake pipe 2 for adjusting the amount of intake air Qa supplied to the engine 1, and a throttle opening sensor 4 is provided on the electronic throttle valve 3 for detecting the degree of opening (i.e., throttle opening θ) of the throttle valve 3.

In addition, an air flow sensor 5 for detecting the amount of intake air Qa and an air cleaner 6 for purifying intake air are arranged in the intake pipe 2 at the upstream side of the electronic throttle valve 3.

The throttle opening θ and the amount of intake air Qa detected by the throttle opening sensor 4 and the air flow sensor 5, respectively, are input to an ECU 7 (electronic control unit).

Also, an injector 8 for injecting fuel into the intake passage 2 is installed on the intake passage 2 at the upstream side of the engine proper 1, and a spark plug 9 is installed in each combustion chamber (not shown) of the engine proper 1.

The electronic throttle valve 3, the injector 8 and the spark plugs 9 (though only one is illustrated in FIG. 1) together constitute various kinds of actuators of the engine 1, and they are individually controlled to be driven by means of the ECU 7 in accordance with the operating conditions of the engine 1.

In addition to the throttle opening sensor 4 and the air flow sensor 5, provision is made, as various kinds of sensors for detecting the operating conditions of the engine 1, for An accelerator opening sensor 10 mounted on an accelerator pedal (not shown) for detecting the opening or depression thereof, and a vehicle speed sensor 11 attached to a speedometer (not shown) for detecting the running or traveling speed of the vehicle.

The degree of opening α of the accelerator pedal (accelerator opening degree α) and the vehicle speed Vs detected by the accelerator opening sensor 10 and the vehicle speed sensor 11, respectively, are input to the ECU 7 as information indicating the operating conditions of the engine 1, similar to the information of other various kinds of sensors.

Here, note that a crank angle sensor and a cam angle sensor (not shown) are mounted on a crankshaft and a camshaft (not shown) of the engine 1, so that information indicating the rotational speed of the engine 1 and the rotational angle position of each cylinder, detected by the crank angle sensor and the cam angle sensor, is also input to the ECU 7.

The ECU 7 is comprised of a microcomputer including a CPU 71 for performing arithmetic calculations for control or the like, a RAM 72 and a ROM 73 connected to the CPU 71, and an I/O (input-output) interface 74.

The CPU 71 includes a target opening calculating section for calculating a target opening degree θo of the electronic throttle valve 3 based on the degree of opening α of the accelerator pedal, and an electronic control section for driving the electronic throttle valve 3 so as to make the throttle opening θ coincide with the target opening degree θo.

Moreover, the target opening calculating section in the CPU 71 includes a correction factor calculating section for calculating a correction factor K to correct the target opening degree θo, and the correction factor calculating section sets an arithmetic calculation gain for the correction factor K corresponding to the characteristic between the throttle opening θ and the amount of intake air Qa. More specifically, the correction factor calculating section sets mutually different arithmetic calculation gains for ranges of mutually different characteristics, respectively.

The CPU 71 includes a failure determining section for determining the presence or absence of a failure of the vehicle speed sensor 11. The correction factor calculating section in the CPU 71 includes a limit value calculating section that sets the correction factor K to a lower limit KL to limit the vehicle speed Vs to a permitted maximum speed VsH or less when the vehicle speed sensor 11 is in failure.

In the RAM 72, various flags and the like (to be described later) used in the determination processing of the CPU 71 are stored, and various reference value data and the like used in the determination processing of the CPU 71 are stored beforehand in the ROM 73.

The I/O interface 74 performs the input processing of operating condition information from the various kinds of sensors, as well as the output processing of control signals to the various kinds of actuators.

In FIG. 1, the amount of intake air Qa sucked into the engine proper 1 through the air cleaner 6 is measured by the air flow sensor 5 and input to the CPU 71 in the ECU 7 through the I/O interface 74.

The CPU 71 drives the electronic throttle valve 3 in accordance with the load of the engine 1 based on the operating conditions thereof, so that the amount of intake air Qa supplied to the engine 1 can be controlled in a feedback manner so as to become a proper amount. As a result, an optimal amount of intake air Qa corresponding to the operating conditions of the engine 1 is sucked into the engine 1 through the intake pipe 2.

Further, the ECU 7 drives the injector 8 at optimal timing corresponding to the operating conditions of the engine 1 for an optimal drive time (amount of fuel to be injected), so that a required amount of fuel to be supplied to the engine 1 is injected from the injector 8 into the intake pipe 2.

Also, the ECU 7 takes in operating condition information (the amount of intake air Qa, the throttle opening θ, the accelerator opening degree a, the vehicle speed Vs, etc.) through the I/O interface 74 so as to execute the above-mentioned various control operations (air/fuel ratio control, ignition timing control, etc.).

Furthermore, the CPU 71 calculates controlled variables or quantities of the various kinds of actuators (e.g., the target opening degree θo of the electronic throttle valve 3, the amount of fuel injected by the injector 8, the ignition timing of the spark plugs 9, etc.) based on the states of the various kinds of sensors (e.g., the vehicle speed sensor 11, etc.) stored in the RAM 72 and a control program and various maps stored in the ROM 73, and outputs each of the controlled variables (i.e., control signals) through the I/O interface 74 thereby to drive the electronic throttle valve 3, the injector 8 and the spark plugs 9.

Next, reference will be made to the operation of calculating the target opening degree θo according to this embodiment of the present invention while referring to FIG. 2.

Figure 2:
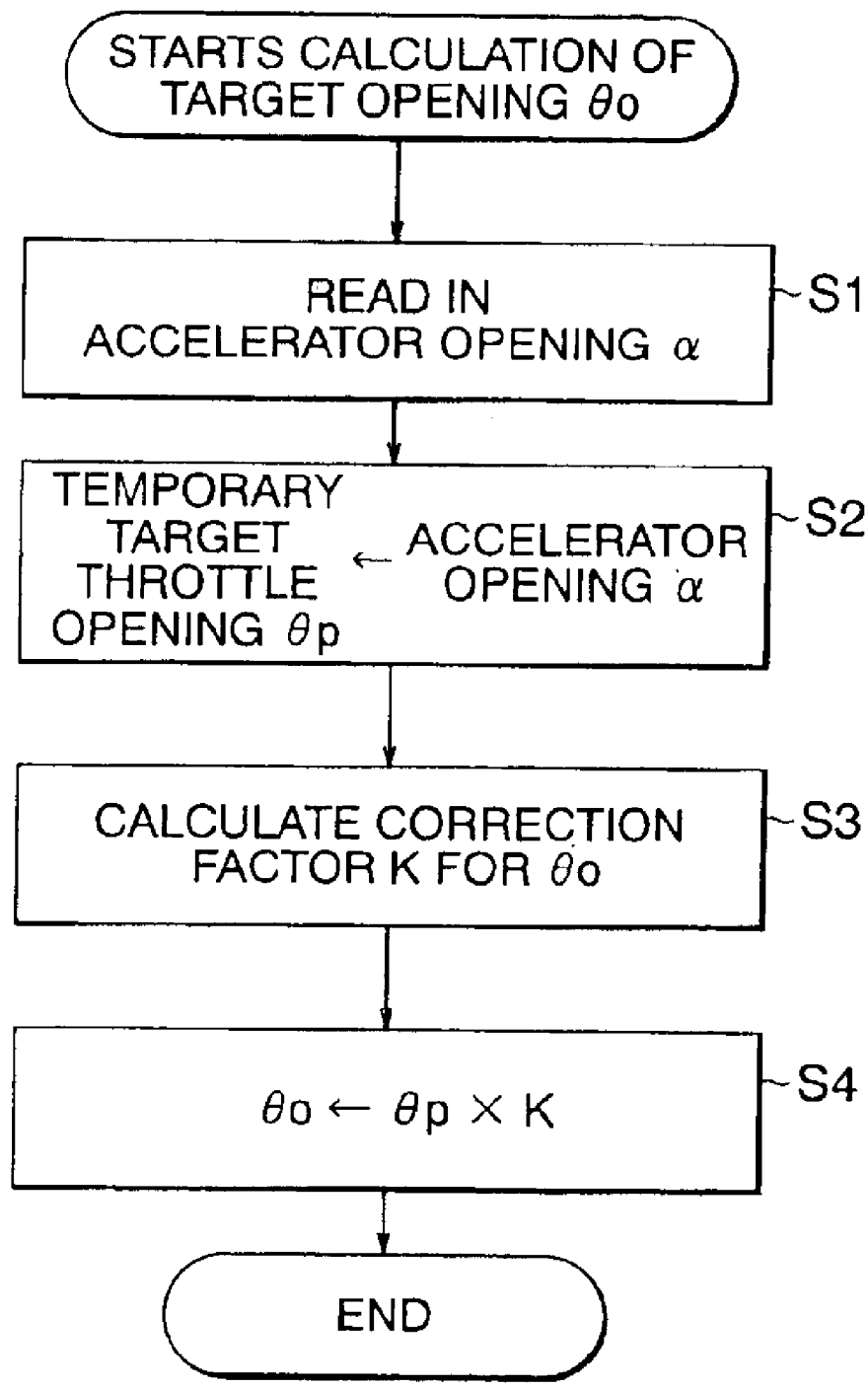
FIG. 2 is a flow chart showing the arithmetic procedure of calculating a target opening degree of an electronic throttle valve in the control apparatus for an internal combustion engine according to the embodiment of the present invention.

FIG. 2 is a flow chart that illustrates the procedure of arithmetically processing or calculating the target opening degree θo of the electronic throttle valve 3, wherein the procedure is performed by the control program stored beforehand in the ROM 73.

In FIG. 2, first of all, the CPU 71 reads the accelerator opening degree a from the accelerator opening sensor 10 (step S1).

Subsequently, the temporary target opening degree θ p of the electronic throttle valve 3 is set based on the degree of opening of the accelerator pedal a referring to a corresponding table (not shown) of "accelerator opening degree α—temporary target throttle opening degree θ p "stored beforehand in the ROM 73, (step S2).

Thereafter, the correction factor K for the target opening degree θ o (to be described later) is calculated and read in (step S3), and the target opening degree θ o (θ p×K) is then calculated by using the temporary target opening degree θ p obtained in step S2 and the correction factor K obtained in step S3 (step S4), and the processing routine of FIG. 2 is completed.

Next, more detailed reference will be made to the procedure of arithmetically calculating the correction factor K (step S3) while referring to a flow chart in FIG. 3.

Figure 3:
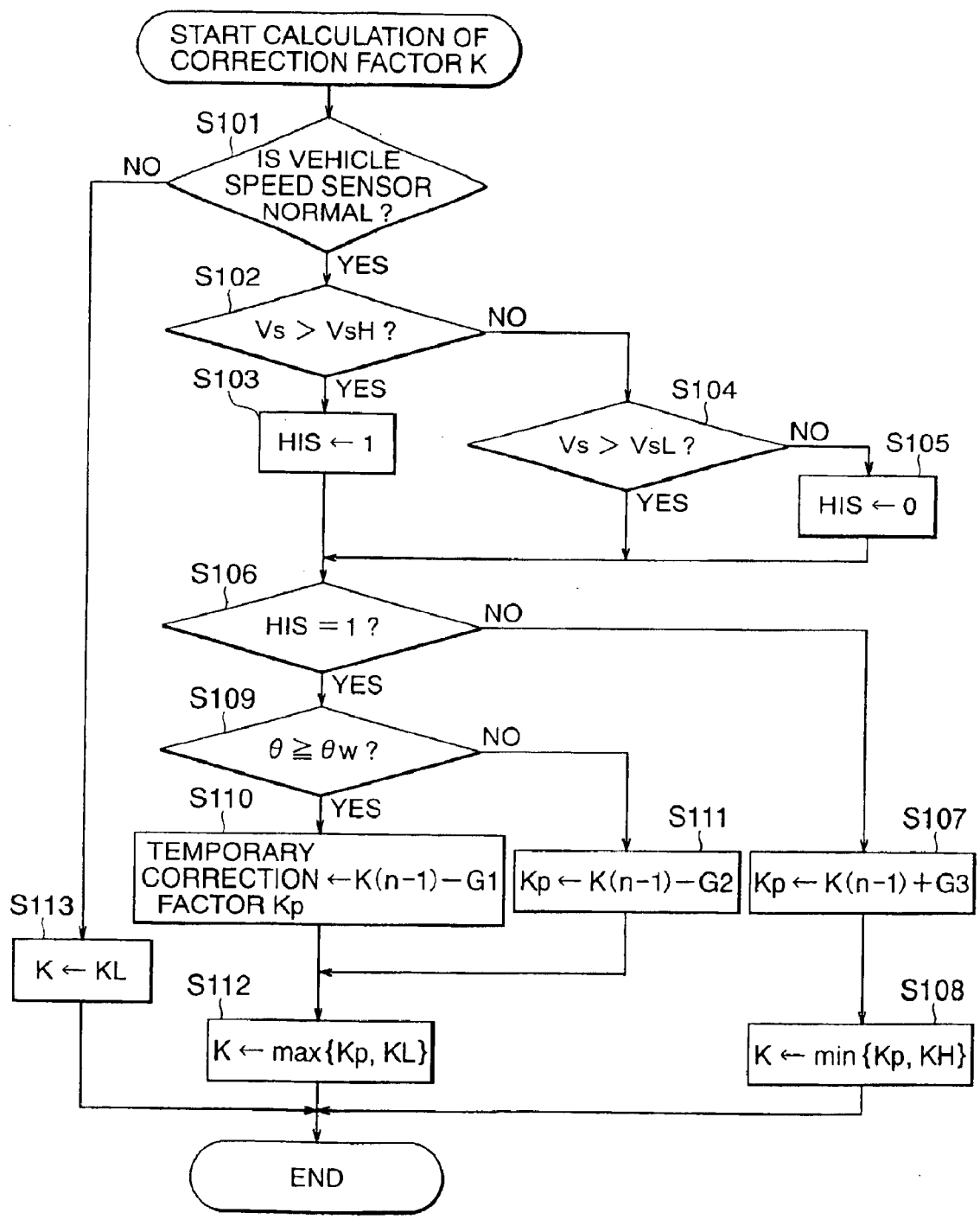
FIG. 3 is a flow chart showing the arithmetic processing of calculating a correction factor in the control apparatus for an internal combustion engine according to the embodiment of the present invention.

In the arithmetic calculation routine for the correction factor K as shown in FIG. 3, first of all, the CPU 71 reads the state flag Fv of the vehicle speed sensor 11 (it is set to "1" at the time of failure), and determines whether the vehicle speed sensor 11 is in a normal state or in a failure state (step S101).

Here, note that the state flag Fv of the vehicle speed sensor 11 is stored in the RAM 72, and if the vehicle speed information from the vehicle speed sensor 11 during fuel cut-off operation (during high speed operation) for a predetermined time indicates Vs=0 km/h, for instance, it is assumed that the vehicle speed sensor 11 is in failure, and thus the state flag Fv is set to "1"(Fv=1), whereas if the vehicle speed information from the vehicle speed sensor 11 indicates Vs>0 km/h, it is assumed that the vehicle speed sensor 11 is normal, and the state flag Fv is reset to "0"(Fv=0).

If it is determined in step S101 that the vehicle speed sensor 11 is in failure (Fv=1)(that is, NO), the control flow advances to setting processing for the correction factor K (step S113 to be described later).

On the other hand, when it is determined in step S101 that the vehicle speed sensor 11 is normal (Fv=0)(that is, YES), it is then determined whether the vehicle speed Vs detected by the vehicle speed sensor 11 exceeds the permitted maximum speed VsH (the vehicle speed set and stored beforehand in the ROM 73 that should not be exceeded from the point of view of the safety of the vehicle)(step S102).

When it is determined as Vs>VsH in step S102 (that is, YES), the direction flag HIS of the throttle opening θ is set up (HIS=1)(step S103), and the control flow advances to the determination processing of the direction flag HIS (step S106 to be described later).

Here, note that the direction flag HIS for determining the direction of operation of the throttle opening 0 is stored beforehand in the RAM 72.

In addition, when the direction flag HIS is in a set state (HIS=1), it is indicated that the electronic throttle valve 3 is in a direction to be closed, whereas when the direction flag HIS is in a reset state (HIS=0), the electronic throttle valve 3 is in a direction to be opened.

On the other hand, when it is determined as Vs≦VsH in step S102 (that is, NO), it is then determined whether the vehicle speed Vs detected by the vehicle speed sensor 11 exceeds a restoration vehicle speed VsL that is set and stored beforehand in the ROM 73 (step S104).

When it is determined in step S104 as Vs≦VsL (that is, NO), the direction flag HIS is reset (HIS=0)(step S105), and the control flow proceeds to step S106, whereas when it is determined as Vs>VsL (that is, YES), the control flow proceeds to step S106 without executing the reset processing of the direction flag HIS (step S105).

In step S106, it is determined whether the direction flag HIS is in the set state (HIS=1) or in the reset state (HIS=0).

When it is determined as HIS=0 in step S106 (that is, NO), a temporary correction factor Kp is calculated by adding a third gain G3 (to be described later) for restoration of the vehicle speed to the last correction factor K(n−1)(step S107).

Here, note that the third gain G3 is set to a relatively small gain value so as to avoid deterioration of driveability at the time of restoration of the vehicle speed.

Finally, the temporary correction factor Kp calculated in step S107 is compared with an upper limit KH (e.g., KH=1.0) that is set and stored beforehand in the ROM 73, and the smaller value of them is calculated as a new correction factor K (step S108), and the processing routine of FIG. 3 is completed.

On the other hand, when it is determined as HIS=1 in step S106 (that is, YES), it is subsequently determined whether the throttle opening θ is more than or equal to a predetermined degree of opening θ w (corresponding to the value at the time of the fully opened position of the throttle valve) (step S109), and the control flow proceeds to step S110 or S111 in accordance with the result of this determination.

When it is determined as θ≧θ w in step S109 (that is, YES), the temporary correction factor Kp is calculated by subtracting a first gain G1 (to be described later) from the last correction factor K(n−1)(step S110), whereas when it is determined as θ<θ w in step S109 (that is, NO), the temporary correction factor Kp is calculated by subtracting a second gain G2 (to be described later) from the last correction factor K(n−1)(step S111).

Finally, the temporary correction factor Kp calculated in step S110 or S111 is compared with the lower limit KL that is set and stored beforehand in the ROM 73, the greater value of them is set as a new correction factor K (step S112), and the processing routine of FIG. 3 is completed.

Here, note that there is a relation of G1>G2 between the first and second gains G1 and G2 as used for the arithmetic expressions in steps S110 and S111.

Figure 4:
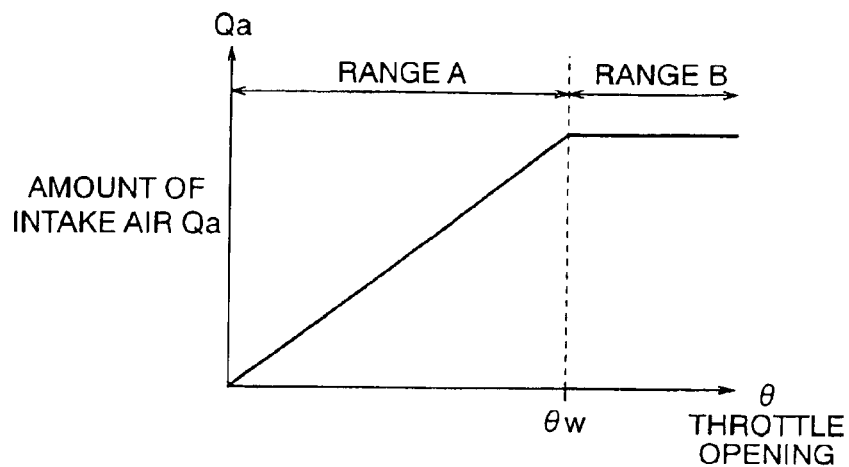
FIG. 4 is a characteristic view showing the relation of the amount of intake air with respect to the throttle opening used in the control apparatus for an internal combustion engine according to the embodiment of the present invention.

FIG. 4 is a characteristic view that shows first and second ranges A, B of the engine operating conditions related to the settings of the these gains G1 and G2, wherein the axis of abscissa represents the throttle opening θ and the axis of ordinate represents the amount of intake air Qa.

In FIG. 4, the first and second ranges A, B are divided by the predetermined degree of opening θ w corresponding to the degree of opening of the fully opened electronic throttle valve 3.

The first and second gains G1 and G2 are respectively set in consideration of the characteristic of the amount of intake air Qa to the throttle opening θ (i.e., the controlled variable of the electronic throttle valve 3 shown in FIG. 4.

That is, when the throttle opening θ is in the second range B, as shown in FIG. 4, the amount of intake air Qa is irrelevant to the change of the throttle opening θ, so it remains unchanged irrespective of the throttle opening 6. Accordingly, in order to shorten a response delay caused until the throttle opening θ shifts from the second range B to the first range A (i.e., the range in which the amount of intake air Qa changes in accordance with the throttle opening θ), the first gain G1 of the largest possible set value is used in the arithmetic calculating processing of the temporary correction factor Kp (step S110).

On the other hand, the amount of intake air Qa changes in accordance with the throttle opening θ0 when the throttle opening θ0 is in the first range A. Accordingly, to avoid the deterioration of driveability, the second gain G2 of a relatively small set value is used in the arithmetic calculating processing of the temporary correction factor Kp (step S111).

As a result, the response delay of the controlled variable of the electronic throttle valve 3 with respect to the amount of intake air Qa can be prevented without inviting the deterioration of driveability.

When it is determined in the processing of determining the state of the vehicle speed sensor 11(step S101) that the vehicle speed sensor 11 is in failure (Fv=1)(that is, NO), the lower limit KL, being set and stored beforehand in the ROM 73, is set as the correction factor K (step S113), and the processing routine of FIG. 3 is completed.

At this time, the lower limit KL of the correction factor K is set to such a value that the throttle opening θ0 becomes the permitted maximum speed VsH or less even when the accelerator pedal is fully depressed to move the throttle valve 3 to its fully opened position. As a result, even in case where the vehicle speed sensor 11 fails, it is possible to avoid the vehicle speed Vs exceeding the permitted maximum speed VsH.

Now, reference will be made to a concrete processing operation of the control apparatus for an internal combustion engine according to this embodiment of the present invention while referring to a timing chart of FIG. 5 together with the characteristic view of FIG. 4.

Figure 5:
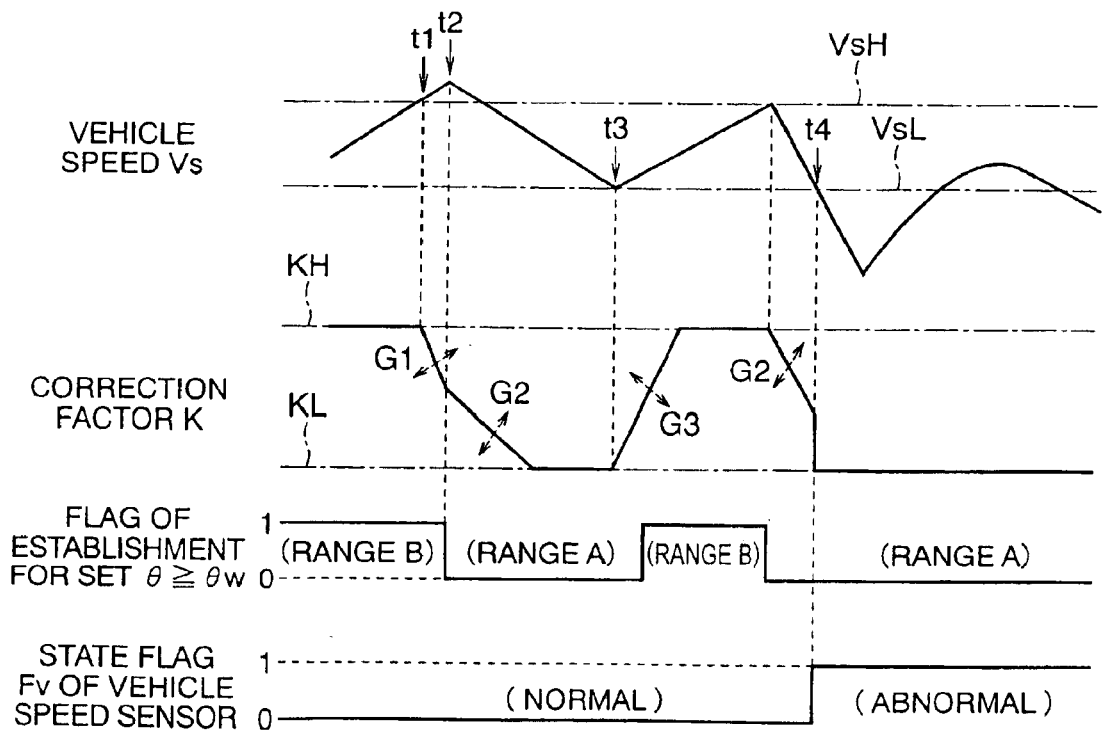
FIG. 5 is a timing chart explaining a concrete operation of the control apparatus for an internal combustion engine according to the embodiment of the present invention.

First, at time point t1 in FIG. 5, the throttle opening θ is in the second range B (i.e., the amount of intake air Qa does not substantially change with respect to a change in the throttle opening θ), so the arithmetic calculating processing of the correction factor K is performed by subtracting the first gain G1 of a large set value from the last correction factor K(n−1).

Subsequently, when at time point t2, the throttle opening θ0 shifts to the first range A (i.e., the amount of intake air Qa changes linearly with respect to a change in the throttle opening θ), the arithmetic calculating processing of the correction factor K is performed by switching the subtraction gain of the correction factor K into the second gain G2 that is smaller than the first gain G1.

The subtraction processing according to the second gain G2 is continuously executed until the correction factor K reaches the lower limit KL or until the vehicle speed Vs reaches the restoration vehicle speed VsL.

FIG. 5 illustrates the case where the subtraction processing according to the second gain G2 is executed until the correction factor K reaches the lower limit KL.

Thereafter, when at time point t3, the vehicle speed Vs decreases to the restoration vehicle speed VsL, the arithmetic calculating processing of the correction factor K is performed by adding the third gain G3 to the last correction factor K(n−1) until the correction factor K reaches the upper limit KH or until the vehicle speed Vs reaches the permitted maximum speed VsH, irrespective of whether the throttle opening θ is in the second range B or in the first range A.

FIG. 5 illustrates the case where the subtraction processing according to the third gain G3 is executed until the correction factor K reaches the upper limit KH.

Finally, when at time point t4, a failure of the vehicle speed sensor 11 is detected, the correction factor K is fixedly set to the lower limit KL so that the vehicle speed Vs does not reach the permitted maximum speed VsH.

As described above, the control apparatus for an internal combustion engine according to the present invention is provided with the accelerator opening sensor 10 for detecting the degree of opening α of the accelerator pedal (i.e., the amount of operation of the accelerator pedal), the vehicle speed sensor 11 for detecting the vehicle speed Vs, and the ECU 7 for controlling to drive the electronic throttle valve 3 based on detection information from the various kinds of sensors. The ECU 7 includes the target opening calculating section for calculating the target opening degree θ of the electronic throttle valve 3 from the degree of opening α of the accelerator pedal and the correction factor calculating section, and serves to calculate the target opening degree θ o of the electronic throttle valve 3 by switchingly setting the arithmetic calculation gain of the correction factor K for the first and second ranges A, B of different characteristics in consideration of the characteristics between the throttle opening θ and the amount of intake air Qa.

As a result, when the throttle opening θ is in the second range B in which the amount of intake air Qa does not substantially change with respect to a change in the throttle opening θ, the subtraction processing (step S110) is executed by using the first large gain G1 so as to operate the electronic throttle valve 3 quickly, whereas when the throttle opening θ is in the first range A in which the amount of intake air Qa changes linearly with respect to a change in the throttle opening 9, the arithmetic calculating processing (step S111) is executed by using the second gain G2 that is smaller than the first gain G1, whereby the response delay of the throttle opening θ with respect to the amount of intake air Qa can be prevented, thus making it possible to limit the vehicle speed Vs to the permitted maximum speed VsH or less with a high degree of precision.

In addition, when the vehicle speed sensor 11 is in failure, the correction factor K is fixedly set to the lower limit KL, so that even if the accelerator pedal is fully depressed so as to move the electronic throttle valve 3 to its fully opened position, the target opening degree θ o of the electronic throttle valve 3 is set to its lower limit in step S4 (see FIG. 2). As a result, the vehicle speed Vs never exceeds the permitted maximum speed VsH, and the vehicle speed Vs can be limited to the permitted maximum speed VsH or less in a reliable manner.

While the invention has been described in terms of a preferred killed in the art will recognize that the invention can be ations within the spirit and scope of the appended claims.

What is claimed is:

1. A control apparatus for an internal combustion engine comprising:

an electronic throttle valve provided in an intake system of said internal combustion engine;

an intake air amount detecting section that detects an amount of intake air sucked into said internal combustion engine;

an accelerator opening detecting section that detects, as an accelerator opening, an amount of operation of an accelerator pedal of a vehicle on which said internal combustion engine is installed;

a speed sensor that detects a running speed of said vehicle;

a target opening calculating section that calculates a target opening of said electronic throttle valve from said accelerator opening;

a throttle opening detection section that detects a throttle opening of said electronic throttle valve; and an electronic control section that drives said electronic throttle valve so as to make said throttle opening coincide with said target opening;

wherein said target opening calculating section includes a correction factor calculating section that calculates a correction factor for correcting said target opening; and said correction factor calculating section sets an arithmetic calculation gain of said correction factor corresponding to characteristics between said throttle opening and said amount of intake air in such a manner that arithmetic calculation gains, being mutually different from each other, are set for ranges of said characteristics different from each other.

2. The control apparatus for an internal combustion engine as set forth in claim 1, wherein said target opening calculating section includes a table for calculating a temporary target opening of said electronic throttle valve with respect to said accelerator opening, and calculates the target opening of said electronic throttle valve by multiplying said temporary target opening obtained from said table by said correction factor;

when said throttle opening is in a state of an opening direction, said correction factor calculating section compares said throttle opening with a predetermined opening corresponding to the fully opened state of said electronic throttle valve, and determines whether said throttle opening is in a first range that is smaller than said predetermined opening or in a second range that is larger than or equal to said predetermined opening; and said correction factor calculating section sets, as an arithmetic calculation gain for subtractively correcting said temporary correction factor, a first relatively small arithmetic calculation gain when said throttle opening is in said first range, and a second arithmetic calculation gain that is larger than said first arithmetic calculation gain when said throttle opening is in said second range.

3. The control apparatus for an internal combustion engine as set forth in claim 2, wherein when said throttle opening is in a state of a closing direction, said correction factor calculating section sets a third arithmetic calculation gain as an arithmetic calculation gain for additively correcting said temporary correction factor.

4. The control apparatus for an internal combustion engine as set forth in claim 1, further comprising a failure determining section that determines whether said vehicle speed sensor is in failure, wherein said correction factor calculating section includes a limit value calculating section that sets said correction factor to a lower limit thereby to limit said vehicle speed to a permitted maximum speed or less when said vehicle speed sensor is in failure.

* * * * *